United States Patent [19]

Murphy, Jr.

[11] 4,222,291

[45] Sep. 16, 1980

[54] CONICAL ROLLER CHAIN INDEXING DEVICE

[76] Inventor: Patrick J. Murphy, Jr., 12554 Knoll Rd., Elm Grove, Wis. 53122

[21] Appl. No.: 914,944

[22] Filed: Jun. 12, 1978

[51] Int. Cl.$^2$ .................... B23B 29/24; F16H 27/02
[52] U.S. Cl. .................... 74/813 R; 74/128; 74/813 L; 74/815; 74/824
[58] Field of Search ............ 74/813 R, 813 C, 813 L, 74/814, 815, 816, 817, 819, 822, 824, 827, 128

[56] References Cited

U.S. PATENT DOCUMENTS

| | | | |
|---|---|---|---|
| 431,855 | 7/1890 | Simpson | 74/824 |
| 520,079 | 5/1894 | Quint | 74/813 L |
| 692,033 | 1/1902 | Rivett | 74/813 R |
| 1,001,484 | 8/1911 | Weitershausen | 74/813 R |
| 1,140,733 | 5/1915 | Burrell | 74/813 L |
| 2,508,568 | 5/1950 | Ellison | 74/128 |
| 2,530,553 | 11/1950 | Strobell | 74/128 |
| 3,501,968 | 3/1970 | Fredell | 74/128 |
| 3,724,248 | 4/1973 | Obermann | 74/128 |
| 3,829,344 | 8/1974 | Julev et al. | 74/128 |
| 3,903,766 | 9/1975 | Dauge et al. | 74/813 L |
| 4,098,254 | 7/1978 | Bose | 126/59.5 X |

Primary Examiner—Samuel Scott
Assistant Examiner—Daniel J. O'Connor
Attorney, Agent, or Firm—Wheeler, Morsell, House & Fuller

[57] ABSTRACT

A fixture for indexing a work piece, a machine spindle, or the like permits indexing a single rotation of the work piece or other mechanism in any integral number of equal divisions. Stops for the divisions are made to suit the job by assembling a standard roller chain with as many pins and pin spaces as there are to be divisions and mounting the chain about a tapered body, preferably a cone. Fixtures hold the chain at the plane in which the periphery of the cone is the right diameter to receive the chain and other parts adjust the indexing stop to overlie the roller chain at that plane. Adjustments are provided to adjust the indexing stop peripherally of the cone a short distance in order to bring the indexing stop to the required rotational position. This adjustment may also be used to adjust the rotatable part a fraction of an indexing stop.

11 Claims, 7 Drawing Figures

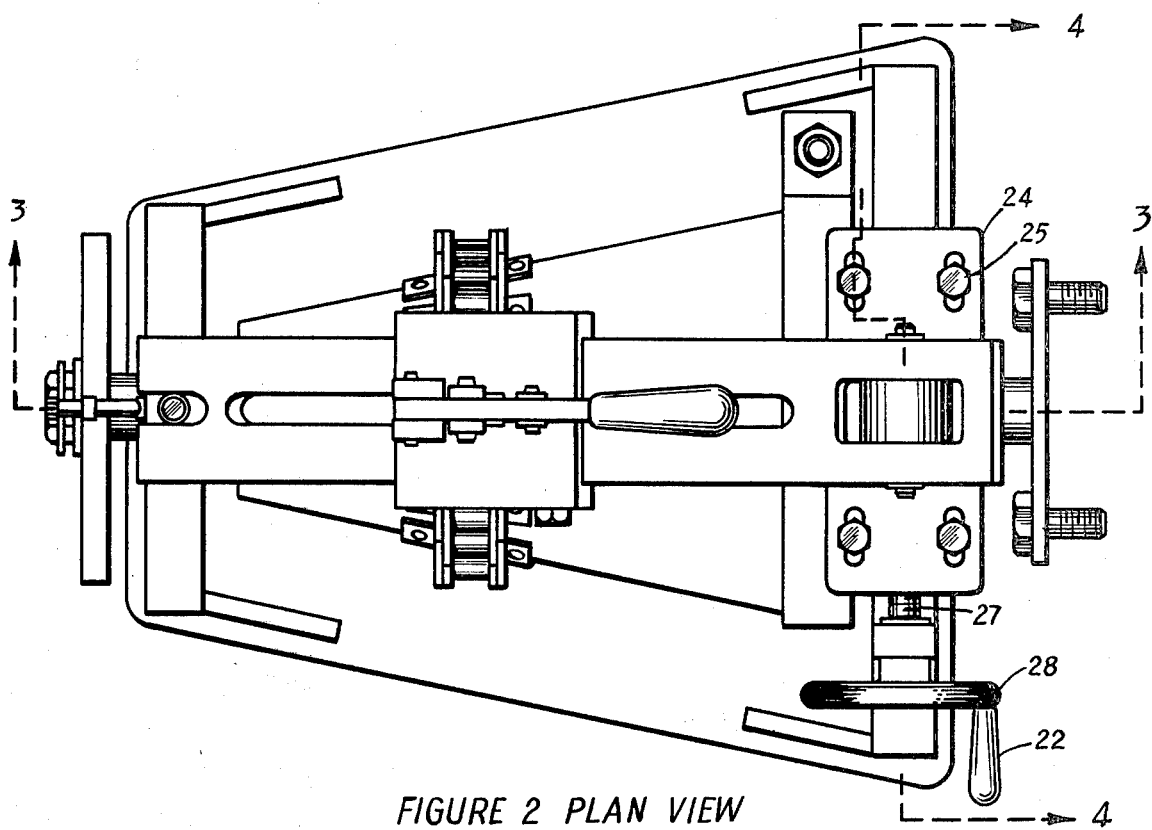
FIGURE 2 PLAN VIEW
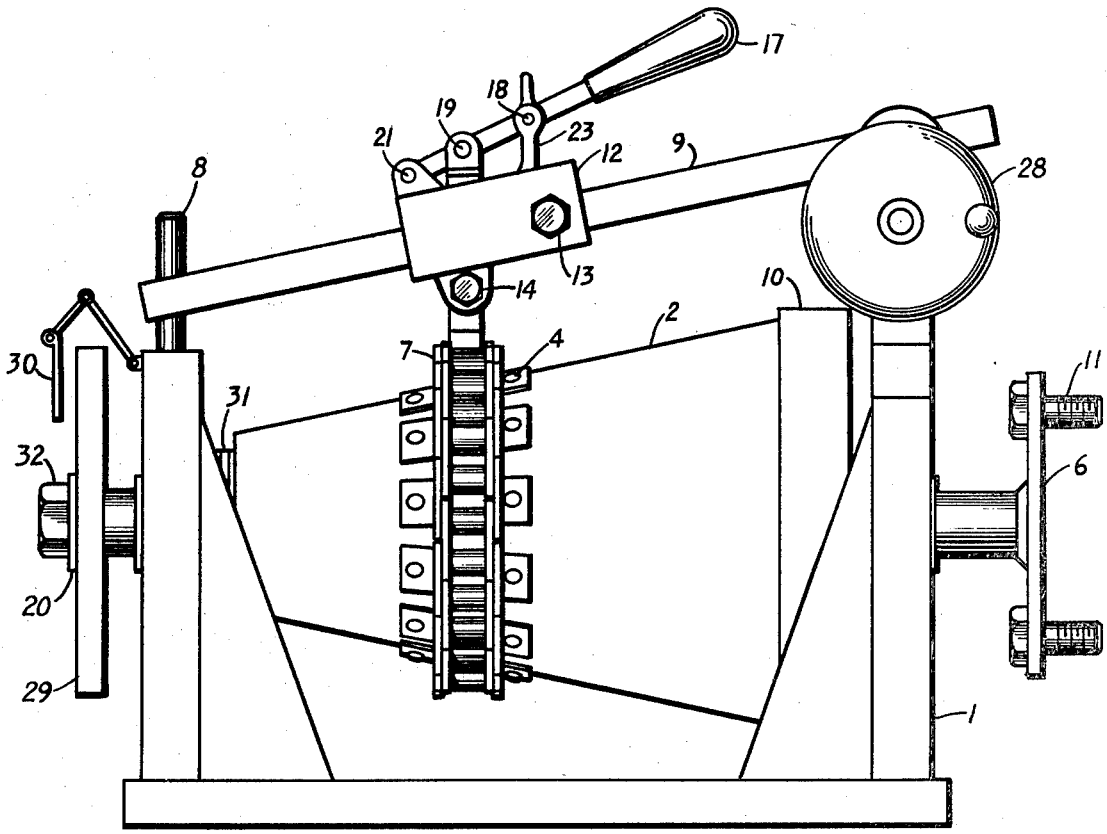
FIGURE 1 ELEVATION VIEW

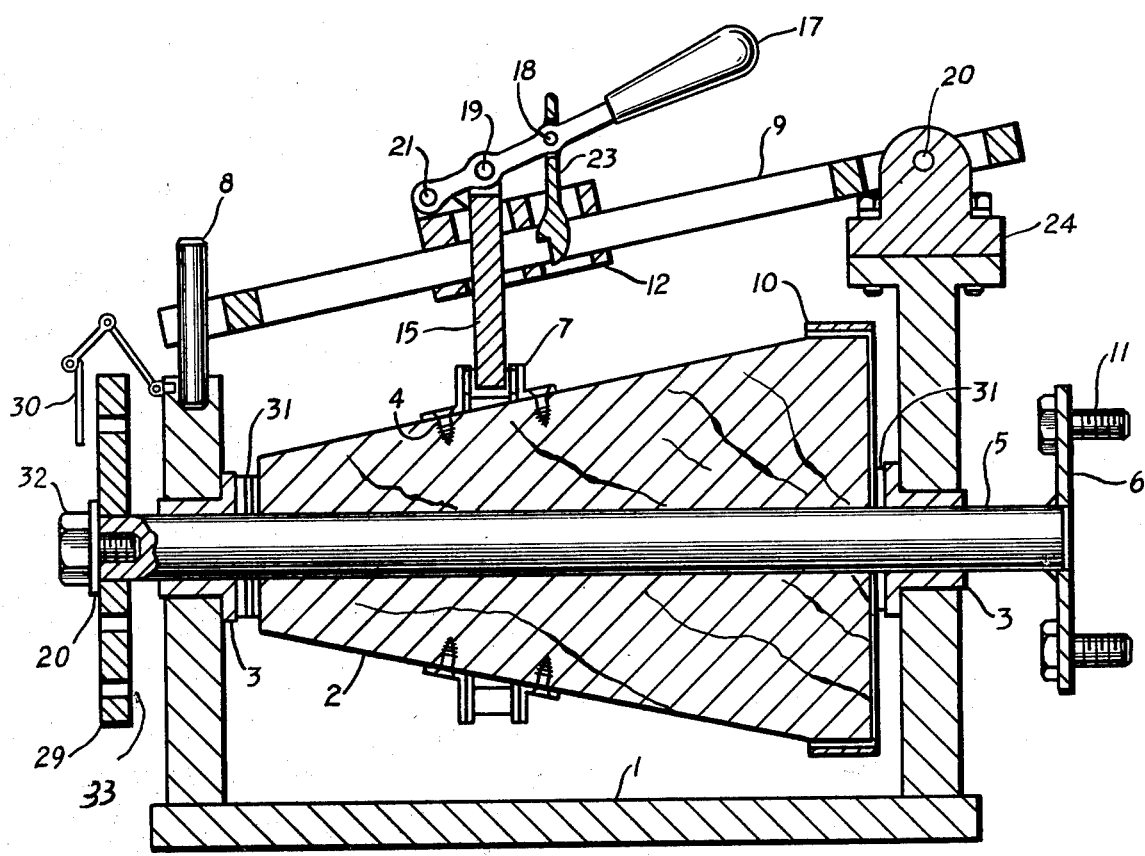
FIGURE 3 SECTION VIEW

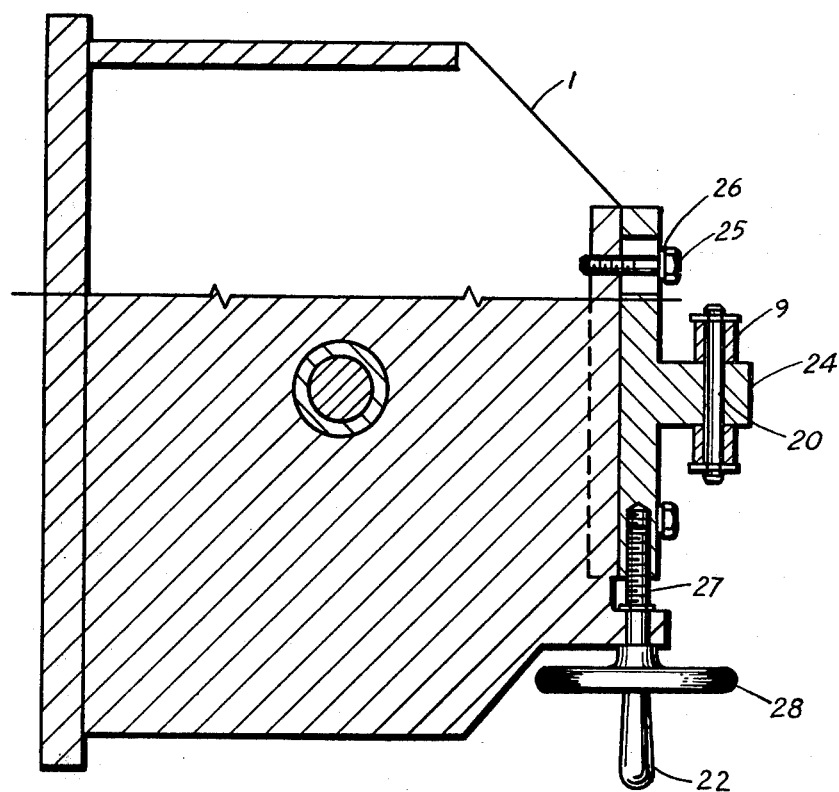
FIGURE 4 SECTION VIEW

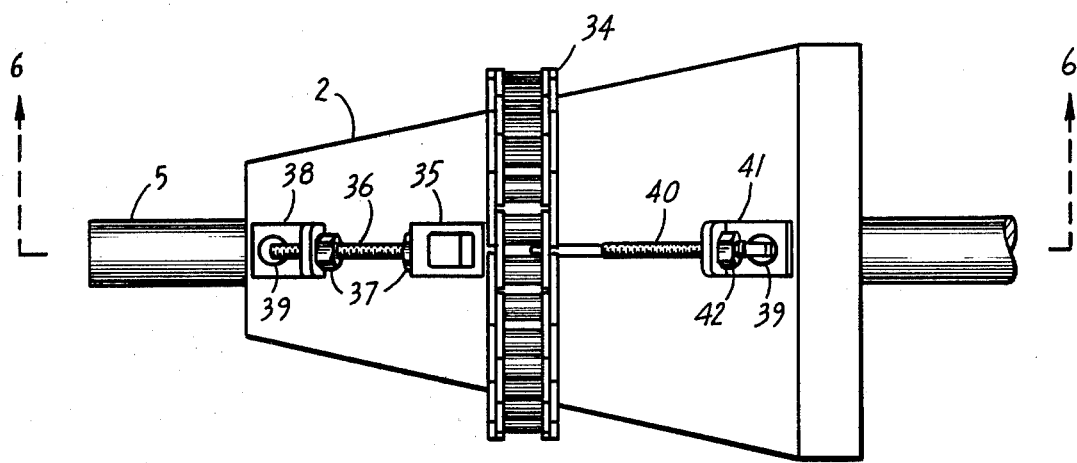
FIGURE 5 PLAN VIEW
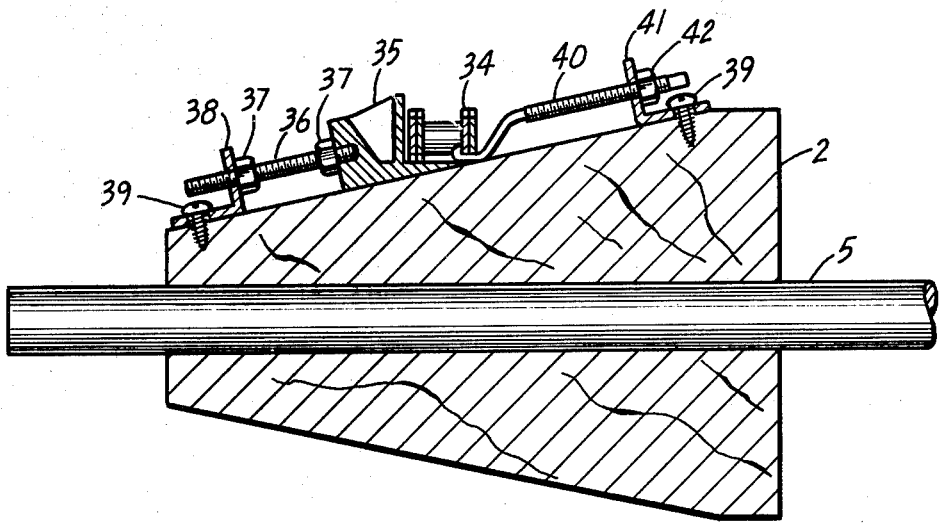
FIGURE 6 SECTION VIEW

CONICAL ROLLER CHAIN INDEXING DEVICE

BACKGROUND OF THE INVENTION

There are a great many machines in which a work piece is rotated to successive positions for performing machining operations, or in which the machine itself is rotated with respect to a stationary work piece to perform necessary operations. These include both metal working machines and wood working devices and possibly additional categories as well. Such machines are often provided with indexing means for specific divisions of a circle such as a quarter circle, an eighth circle, or more rarely, one-third circle, one-sixth circle, etc. No matter how many fixed indexing points are provided, the user of the device may find that he must improvise adjustments between the indexing positions. The provisions for indexing positions other than the fixed stops frequently lack precision and also lack secure holding power. In any case, a large number of such adjustments seriously slows a project. It is an object of my invention to provide an indexing mechanism which provides the utmost flexibility in the number of increments into which a circle may be divided, with great ease, accuracy, and security of adjustment.

I have located the following patents:

| | | |
|---|---|---|
| 3,054,333 | 3,362,295 | 3,443,481 |
| 3,118,347 | 3,367,237 | 3,490,336 |
| 3,251,592 | 3,380,322 | 3,507,188 |
| 3,327,577 | 3,381,578 | 3,532,009 |
| 3,336,823 | 3,412,644 | 3,532,026 |
| 3,344,526 | 3,417,478 | 3,533,328 |
| 3,548,712 | 3,866,309 | 3,975,830 |
| 3,592,102 | 3,866,662 | 3,997,977 |
| 3,661,050 | 3,887,202 | 4,008,900 |
| 3,668,768 | 3,902,537 | 4,012,843 |
| 3,668,772 | 3,938,816 | 4,027,394 |
| 3,680,439 | 3,940,857 | 4,080,738 |

None of these patents, so far as I am aware, discloses any system of indexing in which a circular indexing element is constructed of single standardized stop elements to form a circle of such elements of the required number which is then placed on a tapered body of rotation and secured there, with a stop adjustably placed in the plane of rotation of the circle of elements, so as to permit indexing to any number of increments in a circle including such awkwardly calculated increments as sevenths, seventeenths, or other numbers of segments, and yet changing quickly and conveniently to indexing to a different number of segments forming a complete rotation.

SUMMARY OF THE INVENTION

My invention consists of a tapered body of rotation, such as a cone, on which a circle of stop elements, preferably a roller chain, is secured in a circle by means of elements which fix the stop elements in a plane on that part of the body of rotation having the correct peripheral size, and stop means adjustable to lie in that plane to engage the stop elements and to have the correct angular relationship to a device such as a spindle or workpiece to which my indexing device is attached for rotation at a speed equal or proportional to the speed of rotation of the workpiece or spindle, so that the rotation may be prevented by engagement of the stop means between the stop elements in any reasonable integral number of increments forming a full circle. The range of adjustment is determined by the largest and smallest circumferences of the body of rotation and by the sizes of the stop elements. Roller chains are available in a variety of sizes, which adds to the flexibility of my invention.

My invention further includes a variety of fixtures to attach the stop elements to the body of rotation firmly and precisely and optical means of alignment using the hand wheel to support a layout of work positions.

DRAWINGS

FIG. 1 is a side elevational view of the device of my invention.

FIG. 2 is a top plan view of the device of my invention.

FIG. 3 is a cross-sectional view on line 3—3 of FIG. 2.

FIG. 4 is a cross-sectional view on line 4—4 of FIG. 2.

FIG. 5 is a cross-sectional view similar to FIG. 3 but broken away at the ends and showing a modification of my device.

FIG. 6 is a top plan view of the device shown in FIG. 5 with the ends similarly broken away.

DETAILED DESCRIPTION

Figure 7:
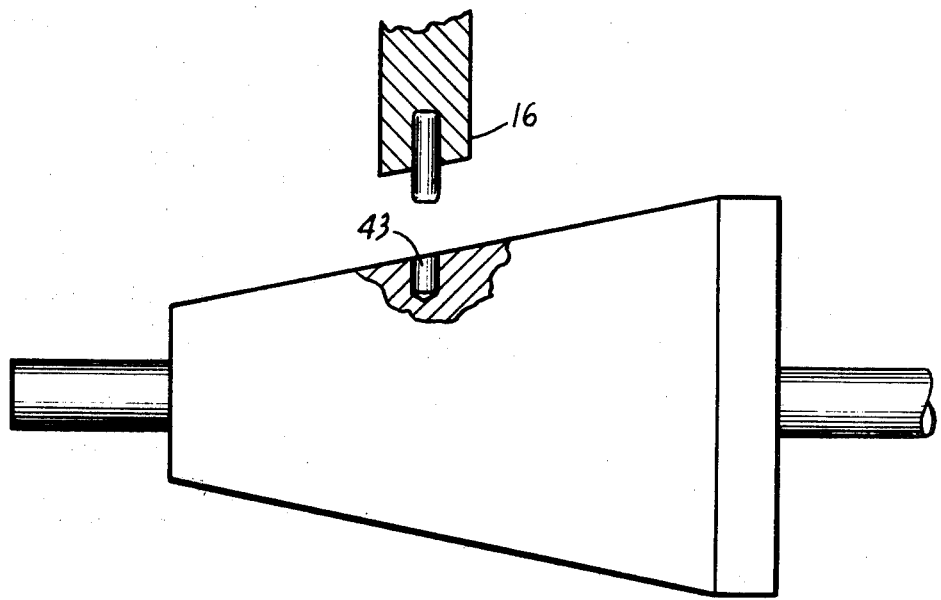
FIG. 7 is a top plan view with the ends broken away similar to FIG. 6 showing a means for installing a single stop.

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims. This invention is an indexing device. It may be used for maintenance and repair work, etc. Indexing is commonly done by means of dividing plates, worm gear drive devices, or through gears with ratios selected for particular jobs. This invention allows for an unusually wide variety of indexing positions with great accuracy and ease of adjustment and is thus particularly suitable for a rebuilder's tool although other uses will suggest themselves. It is portable and adaptable. In particular, the device of my invention allows easy division of a complete circle through which a work piece may be rotated into any integral number of stop positions as will be seen from the further detailed description of specific devices.

My device has a fixed base or frame 1 carrying bearings 3 for a shaft 5 to which is fixed a conical roller or tapered body of revolution 2 which preferably takes the form of a truncated cone throughout the major portion of its body. The largest and smallest diameters are selected to give a range of diameters adequate to accommodate the range of roller chains or other stop elements which will be described later. Preferably, the tapered body of rotation 2 is also provided at one end with a cylindrical portion around which brake band 10 extends so that cone or body 2 may be secured in an adjusted position by means additional to the stop that will be described to relieve the stop from vibrations or other forces exerted on the work piece.

At one end of shaft 5 is an adjusting wheel 29 which may be rotated manually to revolve tapered body 2 and a work piece. Preferably, shaft 5 is also bored and tapped for an axial screw 32 and washer 20 which may be used to secure a layout or template of the desired work positions to which the work piece is to be turned and base 1 is provided with an optical system such as magnifier 30 having a line with which the layout or template can be aligned for accurate positioning. Holes 33 may be provided in wheel 29 for torque bars to assist in moving a heavy work piece or large machine attached to shaft 5.

At the other end of shaft 5 is a flange 6 provided with attaching means such as cap screws 11 for attaching shaft 5 and flange 6 to a work piece, machine spindle, tail stock or work table, etc. If needed, shims 31 (FIG. 3) may be placed between bearings 3 and conical body of rotation 2 to remove any play.

As shown in FIGS. 1 through 6, a circle of stop elements is placed around tapered body of rotation 2. Preferably, the stop elements consist of the rollers or pins and the side plates of a roller chain 7. Roller chains are readily available with pins and side plates of various sizes and are adjustable in length simply by assembling the correct number of rollers or pins and connecting side plates in a well-known manner to form an endless chain of a circumference corresponding to any diameter of the tapered body of rotation or conical roller 2. The roller chain is not used to transmit power but is merely a convenient way of providing the needed circle of stop elements which take the form of the successive pins or rollers of the roller chain 7. The roller chain is installed about conical roller 2 in a plane at right angles to the axis of shaft 5 by any convenient means. The means selected may depend on the material used for conical roller or tapered body of revolution 2. In wood or composition material, the side plates of the chain may have portions nailed or screwed at 4 to secure the chain tightly about cone 2. If conical roller 2 is metal or some other materials chain 7 may be secured by fasteners in holes drilled and tapped in the cone, for instance cap screws, dowels, etc. On steel or ferrous materials it may be held magnetically, or with a body 2 of any material, clamps, anchor rods, push rods, glue, epoxy or welding may be used.

FIGS. 5 and 6 show a structure in which a means for supporting a circle of stop elements such as a roller chain includes an appropriate number of tapered members such as attachments or wedges 35 used to support the chain on a surface which is a portion of a cylinder with an adjoining radial surface holding the chain side plate 34 in the desired position. The tapered wedge 35 may itself be held in a variety of ways but one particularly flexible way is to secure brackets 38 by means of fasteners such as screw 39 to the tapered body of rotation 2. A screw 36 and nut 37 extend from bracket 38 toward wedge 35 and preferably into it. A lock nut 37 at the wedge and a lock nut 37 at the bracket 38 secure the adjustment of wedge 35.

Another means of holding a circle of stop elements such as roller chain 7 having side plates 34 in position, which may be used with the previously described method or separately, comprises a bracket 41 secured by fasteners such as screws 39 to tapered body of rotation 2. A hook 40 extends through a hole in bracket 41 along the surface of the tapered body 2 and is engaged at its end with side plate 34 of the roller chain or with an equivalent structure if other stop elements are used. An adjusting and locking nut 42 is used to apply tension to hook 40 to make roller chain 7 taut about body 2 in a plane perpendicular to the axis of shaft 5 and body 2. As may be seen from the above description, the means for supporting the circle of stop elements may take a variety of forms.

Once one has fixed the circle of stop elements such as roller chain 7 axially in a plane on the tapered body of rotation or roller cone 2 by appropriate supporting means it is necessary to provide a non-rotatable stop mechanism to engage the discreet connected stop elements such as the rollers of roller chain 7. Attached to fixed base or frame 1 and preferably extending parallel to conical roller 2 is a bar 9. The free end of bar 9 may be forked to receive a pin 8 in frame or base 1 (FIGS. 1 and 2) to keep the free end of bar 9 from moving in response to forces exerted to turn the shaft 5 but to permit it to move to carry the stop means radially away from the stop elements.

The other end of bar 9 is pivoted at 20 (FIG. 3) mounted on a block movable at right angles to the plane in which bar 9 pivots to make fine adjustments in the position of the stop mechanism. The block 24 that carries the pivot pin 20 is secured by bolts 25 extending through slots in block 24 to permit such movement. Mounted on base 1 is a hand wheel 28 having a knob 22 to turn a screw 27 extending into a threaded bore in block 24 (FIG. 4). Nut 25 and washer 26 may be used to hold block 24 in its adjusted position.

The mechanism described permits bar 9 to swing toward and away from the stop elements in a plane including the axis of shaft 5 so that as it approaches the stop elements mechanism attached to the bar is moving substantially radially of conical body 2. The exact position in which such movement takes place depends on the position of block 24 which therefore constitutes an adjusting means to move the stop mechanism a small distance in a direction peripheral to the body of rotation for fine adjustment. Bar 9 extends generally axially, and parallel to the tapered surface of the tapered body of rotation in its operative position. Pin or plunger 15 serves as a stop means and is engageable with any selected stop element to fix shaft 5 against rotation. Preferably, the stop pin 15 is pivoted by a pin 19 to release lever 17 which in turn is pivoted by a pin 21 to a block 12 movable along bar 9 in a direction generally parallel to the surface of body 2 to align stop pin 15 with a stop element such as a space between the rollers or pins of roller chain 7. (FIGS. 1 and 3). As shown in FIG. 7 it would be possible to provide stop elements 43 comprising bores in body 2 to receive a pin 15 on a bar 16 carried on bar 9 but this arrangement is less flexible.

Saddle or block 12 is secured by bolt or lock nut 13 to bar 9 when it is in its adjusted position. When plunger or stop pin 15 is in the position shown in FIG. 1 between the rollers of chain 7 it may be secured by a bolt or lock nut 14 against movement. Preferably, after everything is securely in place, brake 10 is engaged to prevent undue pressures from being exerted on stop pin 15 or on the means for supporting the circle of stop elements. Stop pin or plunger 15 is preferably shaped to enter the spaces in the roller chain to provide a secure reproducible stop position.

Preferably, release bar 17 is also provided with a pin or fulcrum 18 supporting a forked latch member 23 which may be engaged with block 12 as it is raised from the position shown in FIG. 3 to keep handle 17 from dropping while shaft 5 and body 2 are being rotated to index the work piece. It may simply be pushed by hand to allow release bar 17 to drop pin 15 radially into a space between one of the discreet connected stop elements of roller chain 7 after which bolt 14 is tightened and brake 10 is engaged. If desired, stop pin or plunger 15 may operate in a hole in block 12 which is radial to shaft 5 and the axis of cone 2. Bar 9 is long enough to allow block 12 to move to all positions above body 2 at which a roller chain 7 may be placed.

Thus it will be seen that my invention provides a machine indexing device in which an axially tapered body of rotation carries means for supporting a circle of stop elements and a plurality of discreet connected stop elements such as a roller chain secured tautly around the body of rotation at the appropriate diameter and over which is disposed a non-rotatable stop mechanism including a stop means engageable with a selected one of the stop elements to fix the tapered body of rotation and its shaft in any of as many stop positions as there are elements, the stop means being movable axially to overlie the appropriate diameter of the body of rotation and the stop mechanism being adjustable to a small degree peripherally for accuracy. Moreover, the hand wheel is provided with convenient means to hold a layout or template and with optical alignment means to use the layout or template directly to align the shaft and the attached part to be indexed.

I claim:

1. In a machine indexing device having a rotatable shaft connected to a part to be indexed, the novelty comprising:

An axially tapered body of rotation fixed to the rotatable shaft for rotation therewith, means for supporting a circle of connected discrete stop elements comprising a selected number of said stop elements on said tapered body of rotation in a plane at right angles to the axis of the shaft and at an axial location on the tapered body of rotation such that the circle of stop elements is taut around the body of rotation, a plurality of said discrete connected stop elements on said support means about said body of rotation, and non-rotatable stop mechanism including stop means engageable with any selected discrete stop element whereby to fix said rotatable shaft against rotation in any one of as many stop positions as there are discrete stop elements.

2. The device of claim 1 wherein said circle of discrete stop elements comprises an endless roller chain made of pins and linking side plates assembled to form a circle of the selected number of pins and spaces, and said stop means includes a part shaped to enter a space between the pins and side plates of said chain.

3. The device of claim 1 further comprising a brake mechanism attached to a fixed part and releasably applicable to the body of rotation after the stop means engages a stop element, to lock the shaft against vibration which would cause error in the stop position.

4. The device of claim 1 in which the stop mechanism includes adjusting means to move it very small distances in a direction peripheral to the body of rotation for fine adjustment of the stop position.

5. The device of claim 2 in which the stop mechanism comprises a bar extending in an axial direction parallel to the tapered surface of the tapered body of rotation and the stop means comprises a stop pin moveable along said bar to align with a space between the rollers of said chain in any plane in which the roller chain is mounted on the tapered body of rotation, said stop pin being movable generally radially with respect to the tapered body of rotation to engage in a space between said rollers of said roller chain.

6. The device of claim 5 in which said bar is secured at one end to a pivot for removal from the vicinity of the tapered body of rotation and in which the pivot is supported on a part movable at right angles to the axis of the shaft for fine adjustment of the stop position, whereby to provide said radial movement of said stop pin.

7. The device of claim 1 in which a hand wheel is fixed to said shaft for rotation of the shaft for indexing and in which the hand wheel is provided with a surface adapted to receive a layout of the required work positions, an optical system having a visible alignment mark in a fixed radial position respecting said shaft so that when said shaft is rotated, the layout of the work positions attached to the hand wheel successively align with the alignment mark of the optical system to provide a visual indication of the desired work position.

8. The device of claim 1 in which the means for supporting a circle of connected discrete stop elements on said tapered body of rotation comprises at least one tapered member having a taper complementary to the shape of the tapered body of rotation inserted between the circle of connected discrete stop elements and the tapered body of rotation to provide a portion of a cylindrical surface of rotation beneath the circle of stop elements, said tapered member further having a vertical surface abutting the side of the circle of stop elements.

9. The device of claim 8 in which a fixed bracket is mounted on the tapered body of rotation and in which a screw extends between said fixed bracket and said tapered member for adjusting the position of the tapered member and securing it.

10. The device of claim 3 in which at least one fixed bracket is secured to the tapered body of rotation and at least one hook is axially adjustably fixed to each said bracket, each said hook being engaged with a side link of said roller chain, said hook being axially adjustable in a direction to move said chain toward a portion of the tapered body of rotation having a larger circumference to tighten the roller chain about the tapered body of rotation.

11. The device of claim 1 in which the tapered body of rotation is a truncated cone having a cylindrical portion at one end, and a brake band extending from a fixed part around said cylindrical portion.

* * * * *